United States Patent
Fuchs et al.

(10) Patent No.: US 7,189,426 B2
(45) Date of Patent: Mar. 13, 2007

(54) NEEDLE-SHAPED X-RAY FLUORESCENT MATERIAL AND METHOD FOR VAPOR-DEPOSITION THEREOF ON A SUBSTRATE

(75) Inventors: Manfred Fuchs, Nürnberg (DE); Erich Hell, Gingen (DE); Wolfgang Knüpfer, Erlangen (DE); Detlef Mattern, Erlangen (DE); Peter Röhrer, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/522,318

(22) PCT Filed: Jul. 18, 2003

(86) PCT No.: PCT/DE03/02429

§ 371 (c)(1),
(2), (4) Date: Jan. 25, 2005

(87) PCT Pub. No.: WO2004/017352

PCT Pub. Date: Feb. 26, 2004

(65) Prior Publication Data

US 2005/0220999 A1    Oct. 6, 2005

(30) Foreign Application Priority Data

Jul. 30, 2002    (DE) ............... 102 34 789

(51) Int. Cl.
B05D 5/06     (2006.01)
C23C 16/08    (2006.01)

(52) U.S. Cl. ............... 427/64; 427/69; 427/255.39

(58) Field of Classification Search ............... 427/58, 427/64, 65, 69, 70, 157, 162, 255.39
See application file for complete search history.

(56) References Cited

U.S. PATENT DOCUMENTS

| | | | | |
|---|---|---|---|---|
| 4,484,619 A | * | 11/1984 | Franz | ............ 165/202 |
| 4,622,272 A | * | 11/1986 | Wengert et al. | ............ 428/690 |
| 6,002,786 A | * | 12/1999 | Hallibert et al. | ............ 382/124 |
| 6,403,239 B2 | * | 6/2002 | Chen et al. | ............ 428/690 |
| 6,567,753 B2 | * | 5/2003 | Potyrailo | ............ 702/39 |
| 6,720,026 B2 | * | 4/2004 | Fuchs et al. | ............ 427/65 |
| 6,936,304 B2 | * | 8/2005 | Fuchs et al. | ............ 427/157 |
| 2004/0058068 A1 | * | 3/2004 | Fuchs et al. | ............ 427/248.1 |
| 2004/0126489 A1 | * | 7/2004 | Fuchs et al. | ............ 427/248.1 |
| 2004/0131767 A1 | * | 7/2004 | Fuchs et al. | ............ 427/99 |

FOREIGN PATENT DOCUMENTS

EP    1 113 458    7/2001
WO    WO 02/20868 A1  *  3/2002

OTHER PUBLICATIONS

"New Needle-crystalline CR Detector," Leblans et al., Medical Imaging 2001: Physics of Medical Imaging, Antonuk et al., Ed., Proc. of Spie, vol. 4320 (2001) pp. 59-67.

* cited by examiner

*Primary Examiner*—Bret Chen
(74) *Attorney, Agent, or Firm*—Schiff Hardin LLP

(57)    ABSTRACT

In a method for vapor-depositing a substrate with a layer of a needle-shaped x-ray fluorescent material containing at least one alkali metal, alkali halide phases and an alkali halide are mixed in a vapor phase and are vapor-deposited on the substrate. A needle-shaped fluorescent material is thereby produced having the formula

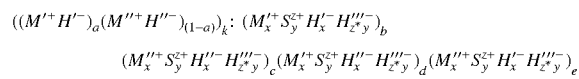

wherein $M^+$ is at least one metal ion from the group Na, K, Rb and Cs, $H^-$ is at least one halide from the group F, Cl, Br and I and $S^{z+}$ is at least one lanthanide ion from the group La, Ce, Pr, Nd, Pm, Sm, Eu, Gd, Tb, Dy, Ho, Er, Tm, Yb or Lu.

13 Claims, No Drawings

NEEDLE-SHAPED X-RAY FLUORESCENT MATERIAL AND METHOD FOR VAPOR-DEPOSITION THEREOF ON A SUBSTRATE

BACKGROUND OF THE INVENTION

1. Field of the Invention

The present invention concerns a method for vapor deposition of a substrate with a layer of a needle-shaped x-ray luminophore with at least one alkali metal as well as the x-ray luminophore itself. As used herein x-ray luminophore scintillator with fluorescence as well as storage luminophore with emission by stimulation with laser light. Fluorescence is generally understood as the excitation of a luminophore with high-energy radiation (UV, x-ray) to cause emission of low-energy radiation (emission). In a storage luminophore, higher-energetic emission (for example 420 nm) is triggered with low-energetic radiation (for example 680 nm) since the "residual energy" in the x-ray has been "stored".

2. Description of the Prior Art

X-ray luminophores are generally used in medical technology and destruction-free material testing. In these applications, scintillators with spontaneous emission under x-ray excitation are used, as well as storage luminophores with formation and storage of electrons and holes with subsequent photo-stimulated emission (PSL) upon irradiation with, for example, red light are used. The x-ray luminophores based on an alkali halide thereby assume a very particular role. Examples are CsI:Na in an x-ray intensifier, CsI:Tl in a-Si detectors or, of late, CsBr:Eu as a storage luminophore plate as described in Proc. of SPIE Vol. 4320 (2001), "New Needle-crystalline CR Detector" by Paul J. R. Leblans et al., pages 59 through 67.

In all cited medical applications of alkali halogenide it is common that a high x-ray absorption must ensue to achieve a high DQE in the alkali halide layer, and the signal (light) must be clear over the noise. A high x-ray absorption is achieved by an approximately 500–600 μm thick alkali halogenide layer. The problem of a still-too-low light yield is still present in all cited medical applications. In particular the low light yield of the storage luminophore represents a problem that is still not completely solved.

In U.S. Pat. No. 5,028,509, example 14 describes the use of CsBr:Eu as a storage luminophore, produced from CsBr and $Eu_2O_3$. The general formula for the combination of the alkali halide luminophore (Cs and Br) is specified as follows:

$$(M_{1-x}.M^I_x)X.aM^{II}X'_2.bM^{III}X''_3{:}dB,$$

whereby M=Cs or Rb, $M^I$ is at least one alkali metal from the group Li, Na, K, Rb and Cs, $M^{II}$ is at least one bivalent metal from the group Be, Mg, Ca, Sr, Ba, Zn, Cd, Cu and Ni, $M^{III}$ is at least one metal from the group Sc, Y, La, Ce, Pr, Nd, Pm, Sm, Eu, Gd, Tb, Dy, Ho, Er, Tm, Yb, Lu, Al, Ga and In, B is an activator that is at least one metal from the group Eu, Tb, Ce, Tm, Dy, Pr, Ho, Nd, Yb, Er, Gd, Lu, Sm, Y, Tl, Na, Ag, Cu, Mg, Pb, Bi, Mn and In, X, X' and X" are the same or different and represent a halogen atom from the group F, Cl, Br and I.

Known from PCT Application WO 01/03156 A1 is a production method for a stimulatable storage luminophore of the general formula CsX:Eu for the combination of the luminophore for the Cs-bromide and/or -chloride. Such a storage luminophore was produced from CsBr and $EuBr_2$, $EuBr_3$ or EuOBr.

European Application 1 113 458 describes a method is described for coating a substrate in which Eu is introduced as $EuX_2$, $EuX_3$, and EuOX.

A common feature of all of these luminophores is that the doping material is a relatively simple molecule. These simple molecules are often attached on interstitials.

In tests with storage luminophore powders, it has been shown that microscopically small phases of the doping material can be formed in the alkali halide. In vacuum-deposited layers of CsBr:Eu, these phases have not been found before. This is due to the Eu concentration in the layer being only maximally 3000 ppm (0.3 mol %), conditional upon production (different vapor pressures of CsBr and $EuBr_2$), while given the use of powder phases an optimal PSL signal was present only given Eu concentrations >1 mol %.

SUMMARY OF THE INVENTION

The invention is to fashion an x-ray luminophore as well as a method for production of a spicular x-ray luminophore, such that an optimal light yield can be achieved.

The object is inventively achieved by a method wherein alkali halogenide phases are simultaneously vaporized with an alkali halogenide, mixed in the vapor phase and vacuum-deposited on the substrate. The use thereby already begins upon coating of the vaporizer with evaporating material. The vaporization of the phase not described in any of the literature cited above; rather, a formation of the phase in the layer is described.

It has proven advantageous when the vaporization is implemented at temperatures between 50° C. and 300° C. and a pressure between 0.001 Pa and 3 Pa.

A better distribution of the evaporated phases and increase of the light yield is obtained when a temperature treatment of the luminophore layer is implemented after the vaporization and a cooling, whereby the temperature treatment after cooling preferably ensues at room temperature in the presence of water vapor.

The temperature treatment inventively can ensue in the range of 100° C. to 300° C. in atmospheric air or an inert gas.

In an advantageous manner, $Cs_xEu_yBr_{(x+2y)}$ can be used as an alkali halogenide phase and CsBr can be used as an alkali halide, such that a x-ray storage luminophore of the general formula $CsBr{:}Cs_xEu_yBr_{(x+2y)}$ forms. It has proven to be advantageous when a quantity x of the alkali halogenide phase and a quantity (600 g−x) of the alkali halide are mutually vaporized.

The substrate, with the layer of the spicular x-ray luminophore, inventively can form a storage luminophore plate.

For inventive mixing, the alkali halogenide phase and the alkali halogenide can be mixed in the vaporization phase and in a vaporization boat, or the alkali halogenide phase and the alkali halide can be separately introduced in a number of vaporization boats.

The object also is inventively achieved by an x-ray luminophore that it is produced according, to the above method, having the following formula:

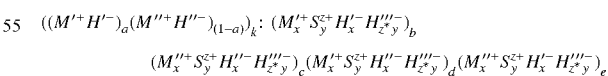

whereby $M^+$ is at least one metal ion from the group Na, K, Rb and Cs, $H^-$ is at least one halogenide from the group F, Cl, Br and I and $S^{z+}$ is at least one lanthanide ion from the group La, Ce, Pr, Nd, Pm, Sm, Eu, Gd, Tb, Dy, Ho, Er, Tm, Yb or Lu.

Particularly advantageous is an x-ray storage luminophore according to the following formula:

$$CsBr{:}Cs_xEu_yBr_{(x+2y)}$$

DESCRIPTION OF THE PREFERRED EMBODIMENTS

The invention is based on the concept of producing the alkali halogenide phases and vaporizing these simultaneously with an alkali halogenide. The vaporization can ensue from a vaporization vessel or from two or more vaporization vessels. A temperature treatment of the storage luminophore, implemented after the vaporization and cooling, leads to a better distribution of the evaporated phases and thus increases the light yield by a factor of 2–10, typically by a factor of 4–5.

Tests have shown that the temperature treatment is effective only after cooling to room temperature given simultaneous presence of water vapor. The water vapor can be added, for example, to an inert gas Ar, $N_2$, He, Ne, Kr or can be in atmospheric air. A direct high heating—also after cooling after the vaporization—has as a consequence no improvement of the light yield. The layer must thus initially have been reposed to water vapor.

Needle-shaped layers that enable a homogenous distribution of the phase material in the alkali halogenide are created upon vaporization conditional upon the pressure and temperature control. As a consequence, 100–800 ppm of the phase material (average value above the layer thickness) is already sufficient in order to achieve an optimal light yield.

In vaporization, temperatures are set between 50° C. and 300° C. and pressures are set between 0.001 Pa and 3 Pa. The temperature given subsequent tempering preferably is as high as the average substrate temperature was upon vaporization.

The tempering time is selected such that the desired light yield is achieved.

As a result of this mixture made from alkali halogenide and alkali halogenide phase in the vaporization phase, a new spicular luminophore type is produced that can be described with chemical formulas as follows.

Via the formation of a phase $Cs_xEu_yBr_{(x+2y)}$ in CsBr, a storage luminophore with very high light yield results of the combination:

$CsBr:Cs_xEu_yBr_{(x+2y)}$.

The general formula for the $M^+$ alkali halides Na, K, Rb and Cs as well as $H^-$ halogens F, Cl, Br and I reads:

$M'^+H'^-:M'^+_xEu_yH'^-_xH''^-_{2y}$, (also possible: ... $H''_xH'_{2y}$)

whereby the halogens $H'^-$ and $H''^-$ can be the same or different.

Two (or more) alkali halogenides can also be used as a matrix lattice; the general sum formula then reads:

$(M'^+H'^-)_a(M''^+H''^-)_{(1-a)}:M'^+_xEu_yH'^-_xH''^-_{2y}$, whereby the alkali halides $M'^+$ and $M''^+$ can be the same as well as different. Likewise, the halogens $H'^-$, $H''^-$ and $H'''^-$ can be the same or different.

According to the above configuration, other phases are also conceivable:

$(M'^+H'^-)_a(M''^+H''^-)_{(1-a)}:M'^+_xEu_yH''^-_xH'''^-_{2y}$, and

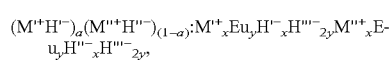

and generalized:

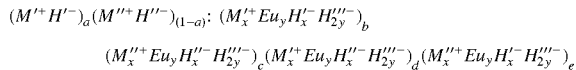

(or without $H'''^-$, only made of $H'^-$, $H''^-$), whereby a can be equal to 1, b, c, d and e can be equal to 0, and $H'^-$, $H''^-$ and $H'''^-$ can be the same or different.

Instead of $Eu^{2+}$, other lanthanides $S^{z+}$ from the group La, Ce, Pr, Nd, Pm, Sm, Gd, Tb, Dy, Ho, Er, Tm, Yb or Lu can also be used. The corresponding general formula then reads:

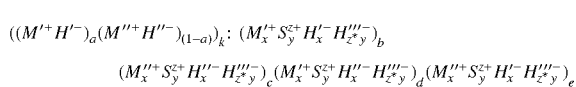

The factor k can be 0, such that "pure" phase material is obtained.

Both scintillators (luminophores) and storage luminophores are contained under the cited x-ray luminophores.

Some exemplary embodiments for production of the inventive luminophore are subsequently specified:

a) 50 g $CsEuBr_3$ are mixed with 550 g CsBr, and subsequently a storage luminophore $CsBr:Cs_xEu_yBr_{(x+2y)}$ (spicular) is produced with the typical vacuum-deposition method.

b) 20 g $CsEu_2Br_5$ are mixed with 580 g CsBr, and subsequently a storage luminophore $CsBr:Cs_xEu_yBr_{(x+2y)}$ (spicular) is produced with the typical vacuum-deposition method.

c) 100 g $CsEu_3Br_7$ are mixed with 500 g CsBr, and subsequently a storage luminophore $CsBr:Cs_xEu_yBr_{(x+2y)}$ (spicular) is produced with the typical vacuum-deposition method.

d) 10 g $Cs_2EuBr_4$ are mixed with 590 g CsBr, and subsequently a storage luminophore $CsBr:Cs_xEu_yBr_{(x+2y)}$ (spicular) is produced with the typical vacuum-deposition method.

e) 10 g $Cs_3EuBr_5$ are mixed with 590 g CsBr, and subsequently a storage luminophore $CsBr:Cs_xEu_yBr_{(x+2y)}$ (spicular) is produced with the typical vacuum-deposition method.

f) 100 g $Cs_4EuBr_6$ are mixed with 500 g CsBr, and subsequently a storage luminophore $CsBr:Cs_xEu_yBr_{(x+2y)}$ (spicular) is produced with the typical vacuum-deposition method.

g) 30 g $Cs_2Eu_2Br_6$ are mixed with 570 g CsBr, and subsequently a storage luminophore $CsBr:Cs_xEu_yBr_{(x+2y)}$ (spicular) is produced with the typical vacuum-deposition method.

h) 70 g $Cs_3Eu_2Br_7$ are mixed with 530 g CsBr, and subsequently a storage luminophore $CsBr:Cs_xEu_yBr_{(x+2y)}$ (spicular) is produced with the typical vacuum-deposition method.

i) 35 g $Cs_3Eu_3Br_9$ are mixed with 565 g CsBr, and subsequently a storage luminophore $CsBr:Cs_xEu_yBr_{(x+2y)}$ (spicular) is produced with the typical vacuum-deposition method.

j) 25 g $CsEuBr_3$ and 25 g $Cs_2Eu_2Br_6$ are mixed with 550 g CsBr, and subsequently a storage luminophore $CsBr:Cs_xEu_yBr_{(x+2y)}$ (spicular) is produced with the typical vacuum-deposition method.

k) 15 g $CsEuBr_3$ and 25 g $Cs_3Eu_3Br_9$ are mixed with 560 g CsBr, and subsequently a storage luminophore $CsBr:Cs_xEu_yBr_{(x+2y)}$ (spicular) is produced with the typical vacuum-deposition method.

l) 20 g CsEuBr$_3$ and 10 g CsEu$_2$Br$_5$ are mixed with 570 g CsBr, and subsequently a storage luminophore CsBr: Cs$_x$Eu$_y$Br$_{(x+2y)}$ (spicular) is produced with the typical vacuum-deposition method.

m) 10 g CsEuBr$_3$ and 40 g CsEu$_3$Br$_7$ are mixed with 550 g CsBr, and subsequently a storage luminophore CsBr: Cs$_x$Eu$_y$Br$_{(x+2y)}$ (spicular) is produced with the typical vacuum-deposition method.

n) 30 g CsEuBr$_3$ and 20 g Cs$_2$EuBr$_4$ are mixed with 550 g CsBr, and subsequently a storage luminophore CsBr: Cs$_x$Eu$_y$Br$_{(x+2y)}$ (spicular) is produced with the typical vacuum-deposition method.

o) 60 g CsEuBr$_3$ and 20 g Cs$_3$EuBr$_5$ are mixed with 520 g CsBr, and subsequently a storage luminophore CsBr: Cs$_x$Eu$_y$Br$_{(x+2y)}$ (spicular) is produced with the typical vacuum-deposition method.

p) 40 g CsEuBr$_3$ and 20 g Cs$_3$Eu$_2$Br$_7$ are mixed with 540 g CsBr, and subsequently a storage luminophore CsBr: Cs$_x$Eu$_y$Br$_{(x+2y)}$ (spicular) is produced with the typical vacuum-deposition method.

Other mixtures made up of two materials of the CS$_2$ . . . and CS$_2$ . . . compounds and Cs$_2$ . . . and Cs$_3$ or Cs$_4$ . . . compounds—as have been shown in the example Cs . . . —can also be used for production of the storage luminophores. Other quantity, mixture and concentration ratios of 0.1 mol %–20 mol % are also suitable for the production of storage luminophore. Mixtures made from not only two materials, but rather made from three, four . . . materials are also suitable as a basis for a storage luminophore.

If a non-vaporizable residue remains in the vaporization boat, normally CsBr:Cs$_x$Eu$_y$Br$_{(x+2y)}$, pure CsBr can also be refilled and subsequently this mixture can be vaporized. This can also ensue multiple times until the CsBr: Cs$_x$Eu$_y$Br$_{(x+2y)}$ concentration has fallen under 0.1 mol %.

Instead of a mixture, the individual substances Cs$_x$Eu$_y$Br$_{(x+2y)}$ and CsBr can be vaporized from two or more vaporization boats. CsBr and Cs$_x$Eu$_y$Br$_{(x+2y)}$ can also be vaporized as a mixture from one vaporization boat and be vaporized from a different one pure substance, for example CsBr.

A europium/bromine compound (for example EuBr$_2$, EuBr$_3$) can also be vaporized together with the Cs$_x$Eu$_y$Br$_{(x+2y)}$ and CsBr. Instead of the bromides, fluorides, chlorides and/or iodides can be used.

Europium oxybromides (for example EuOBr, Eu$_3$O$_4$Br, Eu$_3$OBr$_4$, Eu$_4$OBr$_6$) can also be vaporized together with the Cs$_x$Eu$_y$Br$_{(x+2y)}$ and CsBr. Instead of the oxybromides, oxyfluorides, oxychlorides and/or oxyiodides can also be used.

Europium oxides (for example EuO, Eu$_2$O$_3$) can also be vaporized together with the Cs$_x$Eu$_y$Br$_{(x+2y)}$ and CsBr.

Europium oxybromide and europium oxide can also be vaporized together with the Cs$_x$Eu$_y$Br$_{(x+2y)}$ and CsBr.

Instead of the specified cesium, other alkaline metals (Na, K, Rb) and all halogenides (F, Cl, Br, I) can be used in the mixtures corresponding to the illustrated general sum formulas.

By doping of an alkali halogenide with an alkali halogenide-rare earth phase, a needle-shaped luminophore type has been produced that is superior to the known luminophore types in terms of its light yield. Depending on the luminophore combination, both scintillators and storage luminophores can be produced.

Although modifications and changes may be suggested by those skilled in the art, it is the invention of the inventors to embody within the patent warranted heron all changes and modifications as reasonably and properly come within the scope of their contribution to the art.

The invention claimed is:

1. A method for producing a luminophore comprising the steps of:

simultaneously vaporizing an alkali halide phase and an alkali halide and thereby producing vaporized material; and vacuum-depositing said vaporized material on a substrate and thereby producing a needle-shaped x-ray luminophore layer having at least one alkali metal on said substrate.

2. A method according to claim 1, comprising implementing the vapor deposition at temperatures between 50° C. and 300° C. and a pressure between 0.001 Pa and 3 Pa.

3. A method according to claim 1 comprising cooling the luminophore layer after said vapor deposition and thereafter tempering the luminophore layer.

4. A method according to claim 3, comprising wherein the step of tempering the luminophore layer comprises tempering the luminophore layer in a mixture of inert gas and water vapor.

5. A method according to claim 3, comprising wherein the step of tempering the luminophore layer comprises tempering the luminophore layer in humid air.

6. A method according to claim 3, wherein the step of cooling the luminophore layer comprises cooling the luminophore layer at room temperature in the presence of water vapor.

7. A method according to claim 3 wherein the step of tempering the luminophore layer comprises tempering the luminophore layer in a range from 100° C. to 300° C.

8. A method according to claim 1, comprising using Cs$_x$Eu$_y$Br$_{(x+2y)}$ as said halide phase and using CsBr as said alkali halide, to form CsBr:Cs$_x$Eu$_y$Br$_{(x+2y)}$ as said luminophore layer.

9. A method according to claim 1 comprising simultaneously vaporizing a quantity x of the alkali halide phase and a quantity (600−x) grams of the alkali halide.

10. A method according to claim 1, comprising mixing the alkali halide phase and the alkali halide and introducing the mixture into a vaporization vessel for vaporization thereof.

11. A method according claim 1 comprising separately introducing the alkali halide phase and the alkali halide into respective vaporization vessels and simultaneously vaporizing said alkali halide phase and said alkali halide in the respective vacuum vessels.

12. A needle-shaped x-ray luminophore layer with at least one alkali metal, produced according to the method according claim 1 having the formula:

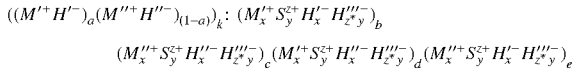

wherein M'$^+$ and M'''$^+$ are respective metal ions selected from the group consisting of Na, K, Rb and Cs, H'$^+$, H''$^+$ and H'''$^+$ are respective halogens selected from the group consisting of F, Cl, Br and I, and S$^{z+}$ is at least one lanthanide ion selected from the group consisting of La, Ce, Pr, Nd, Pm, Sm, Eu, Gd, Tb, Dy, Ho, Er, Tm, Yb or Lu.

13. A needle-shaped x-ray luminophore layer with at least one alkali metal, produced according to the method according claim 1 having the formula:

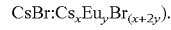

* * * * *